United States Patent
Mayor

(10) Patent No.: US 8,458,310 B1
(45) Date of Patent: Jun. 4, 2013

(54) LOW BANDWIDTH STREAMING OF APPLICATION UPGRADES

(75) Inventor: Christopher Mayor, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 929 days.

(21) Appl. No.: 12/559,201

(22) Filed: Sep. 14, 2009

(51) Int. Cl.
*G06F 15/16* (2006.01)

(52) U.S. Cl.
USPC ........... 709/223; 709/203; 709/221; 709/226; 717/172; 717/173

(58) Field of Classification Search
USPC ........... 709/203, 221, 223, 226; 717/171–173
See application file for complete search history.

(56) References Cited

U.S. PATENT DOCUMENTS

| | | |
|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |
| 5,978,791 A | 11/1999 | Farber et al. |
| 6,003,087 A | 12/1999 | Housel, III et al. |

(Continued)

FOREIGN PATENT DOCUMENTS

| | | |
|---|---|---|
| WO | WO97/00475 | 1/1997 |
| WO | WO97/46955 | 12/1997 |
| WO | WO98/11723 | 3/1998 |

OTHER PUBLICATIONS

Yang Yu, et al: "A Feather-weight Virtual Machine for Windows Applications"; Jun. 14, 2006; pp. 24-34.

(Continued)

*Primary Examiner* — David Lazaro
(74) *Attorney, Agent, or Firm* — Rory D. Rankin; Meyertons, Hood, Kivlin, Kowert & Goetzel, P.C.

(57) ABSTRACT

A system and method for reducing the amount of data transferred during streaming of an application upgrade. The system includes a server that streams application upgrades to a client. The client determines that an application upgrade is available and receives a first map from the server that corresponds to an upgraded version of the application. The client generates a second map of the currently installed application. The client compares the first map to a second map that corresponds to the application currently installed on the client to determine that one or more data blocks corresponding to the upgraded version of the application are not present in the application currently installed on the client. The client requests the one or more data blocks from the server. Both maps include entries that include data describing a size, a location, and a hash value of a corresponding data block.

17 Claims, 9 Drawing Sheets

U.S. PATENT DOCUMENTS

| | | | |
|---|---|---|---|
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,311,221 | B1 | 10/2001 | Raz et al. |
| 7,735,057 | B2 | 6/2010 | Rachman et al. |
| 2004/0230971 | A1 | 11/2004 | Rachman et al. |
| 2008/0010630 | A1 | 1/2008 | Ou-Yang et al. |
| 2009/0249324 | A1* | 10/2009 | Brar et al. .................... 717/173 |

OTHER PUBLICATIONS

Japanese Patent Application Laid-open No. Hei 10-133976.
Japanese Patent Application Laid-open No. Sho 64-36332.
Japanese Patent Application Laid-open No. Hei 10-162057.
G. Glass, "A Universal Streaming Service", C++ Report, Apr. 1996, pp. 74-76 and 81-83.
T. Ritchey, "Java!", New Riders Publishing, Dec. 1995, pp. 214-216.
Chen, Z. et al., (Dec. 11-14, 1995) "Real time video and audio in the world wide web" World Wide Web Journal, Fourth International World Wide Web Conference, pp. 333-348.
Jiang, Z. and Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries Are Necessary to Handle Live Business Data As It Speeds Through a Company", internet website www.byte.com BYTE Magazine, Feb. 1998, 5pgs.
V. Hoff et al., "The Open Software Description Format (OSD)", internet website www.w3.org, Aug. 11, 1997, pp. 1-13.
Red Brick Vista, "Aggregate Computation and Management", internet website www. informix.com, printed Oct. 4, 2000.
Fireclick, "Web Site Performance is Key to E-Commerce Sucess", internet website WWW. Fireclick.com printed, Nov. 1, 2000.
Boost Web Optimizer Technology Overview, "How it Works", Sep. 27, 2000 and internet website www.boostworks.com printed Nov. 1, 2000.
"Delivering Windows to the Net White Paper", WinToNet by Menta Software, 2000 and Website http:/1216.205.21.102/ printed Nov. 1, 2000.
"First There was Streaming Audio, then Streaming Video. Now get ready for Streaming Software", Stream Theory White paper and Website WWW.Streamtheory.com printed Sep. 22, 2000.
"OSD Describing Software Package on the Internet", Marimba Inc. White paper 1998 and wedsite www.marimba. com, printed Nov. 1, 2000.
"Timbale for Windows Terminal Services" Marimba Promotional document, undated, 2000.
Japanese Patent Application Laid-open No. Hei 8-51596.
Japanese Patent Application Laid-open No. Hei 10-91446.
Japanese Patent Application Laid-open No. Hei 7-271603.
Japanese Patent Application Laid-open No. Hei 8-6878.
"A Low-Bandwidth Network File System"; Muthitacharoen, et al.; MIT Laboratory for Computer Science and NYU Department of Computer Science; 2001.

* cited by examiner

LOW BANDWIDTH STREAMING OF APPLICATION UPGRADES

BACKGROUND OF THE INVENTION

1. Field of the Invention

This invention generally relates to streaming applications in a computing system. More particularly, the invention relates to a system and method for streaming application upgrades in a low bandwidth environment.

2. Description of the Related Art

A common method of delivering software applications in computing systems is via a streaming server. "Streaming" in this context generally refers to a form of on-demand software distribution in which an application is downloaded from a server, or other host, to a target in response to a request (demand) from the target. Such a software application may be referred to as a "streamed application." Such techniques may include initially streaming only those portions of an application necessary to install and begin execution of the application with basic or otherwise required functionality. In this manner, the entire application need not be downloaded to a target computing system prior to beginning execution of the application. If other portions of the application are needed, they may be delivered in the background or on demand through the same streaming mechanism. For example, the server computer may first stream one or more startup blocks which include just enough executable code for the streamed application to be launched on the host computer. Upon receiving the startup blocks, the host computer may execute the startup blocks to launch the streamed application. Further blocks of code or data for the streamed application may then be dynamically streamed to the host computer from the server computer while the streamed application is executing.

As the number and variety of applications in use as well as the number of clients served by a server increase, the bandwidth needed for data transfer also increases. When an application upgrade becomes available, bandwidth may be consumed for data transfers to each client that requires the upgrade. However, with the proliferation of a variety of connection technologies to support mobile computing on a wide selection of different client devices has come a corresponding likelihood that a client will have a low-bandwidth connection to a server.

In addition to the above considerations, it is known that different versions of applications may share a significant portion of their data. Consequently, at least some of the data transferred in an upgrade is redundant data. Accordingly, systems and methods of streaming updates to clients that take advantage of redundant data and reduce bandwidth utilization may be desired.

SUMMARY OF THE INVENTION

Various embodiments of a system and method for reducing the amount of data transferred during streaming of an application upgrade are contemplated. According to some embodiments, a system may include a client and a server. The server streams application upgrades to the client. The client determines that an upgrade to an application currently installed on the client is available and receives a first map from the server that corresponds to an upgraded version of the application. The client compares the first map to a second map that corresponds to the application currently installed on the client to determine that one or more data blocks corresponding to the upgraded version of the application are not present in the application currently installed on the client. The client requests the one or more data blocks from the server.

In a further embodiment, the first and second maps each include a plurality of entries. Entries in the first map correspond to data blocks that correspond to the upgraded version of the application. Entries in the second map correspond to data blocks that correspond to the currently installed application. Each entry includes data describing a size, a location, and a hash value of a corresponding data block. In a still further embodiment, the one or more data blocks of data are variable sized portions of a data file. A boundary defining a size of a given data block is determined by identifying that a predetermined pattern of data exists in the data file. In a still further embodiment, the upgraded version of the application includes a multiple files and the first map includes a separate map for each file.

Embodiments are contemplated in which to retrieve a block, the client determines that the data block is needed by the application, requests the block from a streaming server, and receives the block in response to the request. In a further embodiment, to determine that one or more data blocks are needed, the client receives information from the server identifying data blocks that are needed to execute an application. In yet another embodiment, to determine that an upgrade to a currently installed application is available, the client requests upgrade information from a server in response to a client user attempting to execute a currently installed application.

Also contemplated is a computer-implemented method for upgrading an application. The method includes determining that an upgrade to a currently installed application is available and receiving a first map from a server, wherein the first map corresponds to an upgraded version of the application. The method further includes comparing the first map to a second map that corresponds to the currently installed application to determine that one or more data blocks corresponding to the upgraded version of the application are not present in the application currently installed on the client. The method further includes requesting the one or more data blocks from the server.

In a still further embodiment, a computer readable storage medium stores program instructions executable by a client computing system to determine that an upgrade to an application currently installed on the client computing system is available and receive a first map from a server that corresponds to an upgraded version of the application. The program instructions are further executable by a client computing system to compare the first map to a second map that corresponds to the application currently installed on the client to determine that one or more data blocks corresponding to the upgraded version of the application are not present in the application currently installed on the client. The program instructions are further executable by a client computing system to request the one or more data blocks from the server.

These and other embodiments will become apparent upon consideration of the following description and accompanying drawings.

Figure 1:
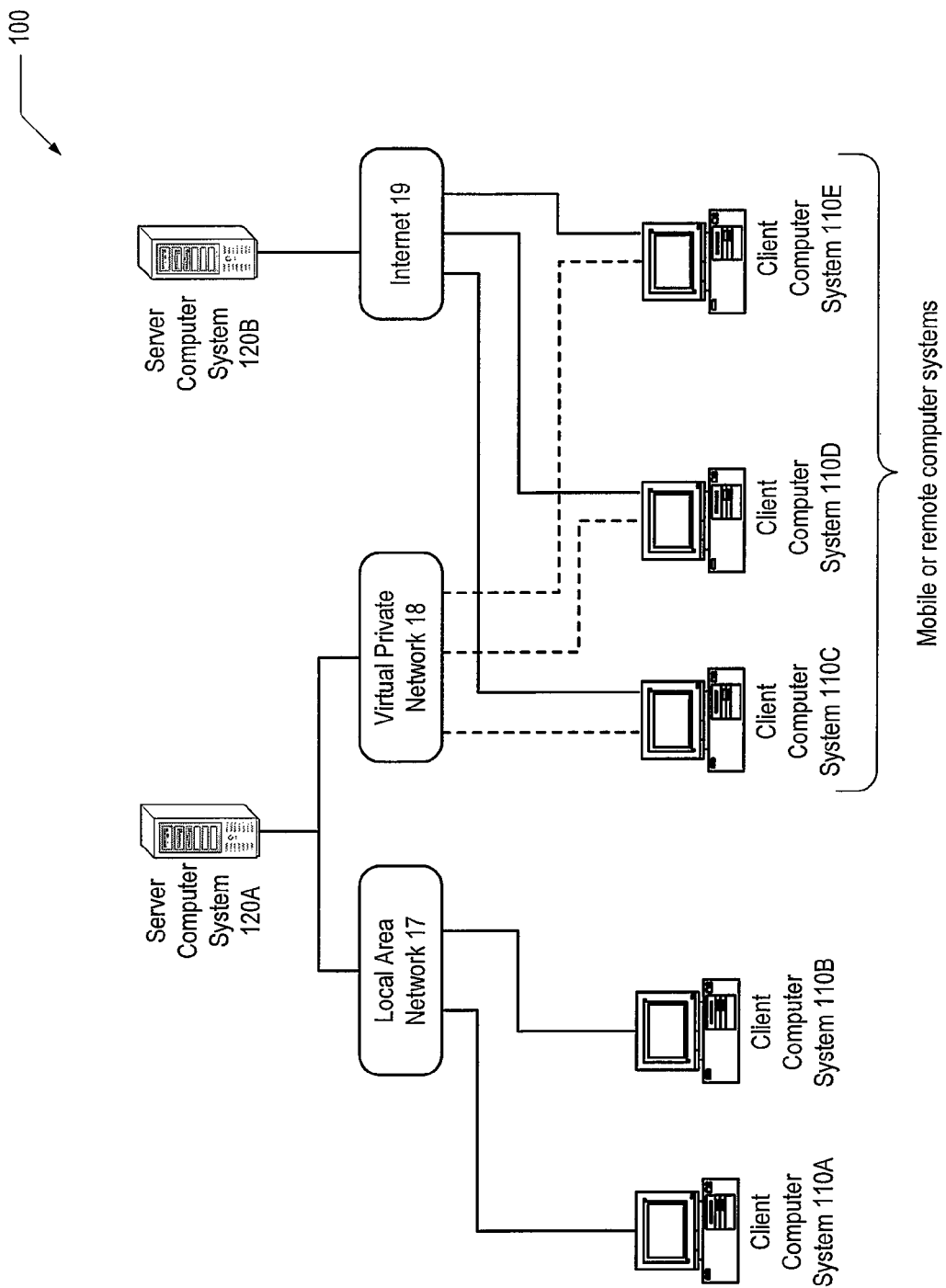
FIG. 1 illustrates one embodiment of a computing system for streaming application upgrades.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for reducing the amount of data transferred during streaming of an application upgrade are described herein. FIG. 1 illustrates one embodiment of such a system. In the embodiment shown, a system 100 includes client computing systems 110A-110E and server computing systems 120A and 120B. As used herein, elements referred to by a reference numeral followed by a letter may be collectively referred to by the numeral alone. For example, client computer systems 110A-110E may be collectively referred to as client computing systems 110. Server computing system 120A is coupled to storage device(s) 125 and server computing system 120B is coupled to storage device(s) 126. Client computer systems 110 and server computer systems 120 may be interconnected through various network elements. For example, client computer systems 110A and 110B are shown coupled to server computer system 120A via a local area network 17, client computer systems 110C, 110D, and 110E are shown coupled to server computer system 120A via a virtual private network 18 and to server computer system 120B via Internet 19. In this embodiment, client computer systems 110C-110E may be mobile and/or remote computer systems. In various embodiments the system may include any number and any type of client computer systems 110 and/or server computer systems 120. Client computer systems 110 are representative of any number of stationary computers and/or mobile computing devices such as laptops, handheld computers, television set top boxes, home media centers, telephones, etc. Client computer systems 110 and server computer systems 120 may operate as peers in a peer-to-peer configuration or as clients and servers in a client/server configuration, or a combination or peer-to-peer and client/server configurations. Each client computer 110 may, for example, be used by a particular user or member of a business or other organization, a home user(s), or otherwise.

In alternative embodiments, the number and type of computer systems and network elements is not limited to those shown in FIG. 1. Almost any number and combination of server, desktop, and mobile computer systems or devices may be interconnected in system 100 via various combinations of modem banks, direct LAN connections, wireless connections, WAN links, etc. Also, at various times, one or more computer systems may operate offline. In addition, during operation, individual computer system connection types may change as mobile users travel from place to place connecting, disconnecting, and reconnecting to system 100. In one embodiment, computer system 100 or a portion thereof may be implemented as part of a cloud computing environment.

During operation, each of the client computer systems 110 and/or server computer systems 120 may obtain, install, and execute one or more software applications in either a physical operating system environment or as virtual software layers. For example, software applications may include e-mail, word processing, spreadsheet, and other office productivity applications, specialized applications for handling graphics, images, audio files, video files, performing numeric calculations and the like. Numerous other software applications are known and are contemplated. In one embodiment, software applications may be conveyed from a server computing system 120 to a host computing system 110 via streaming.

Figure 2:
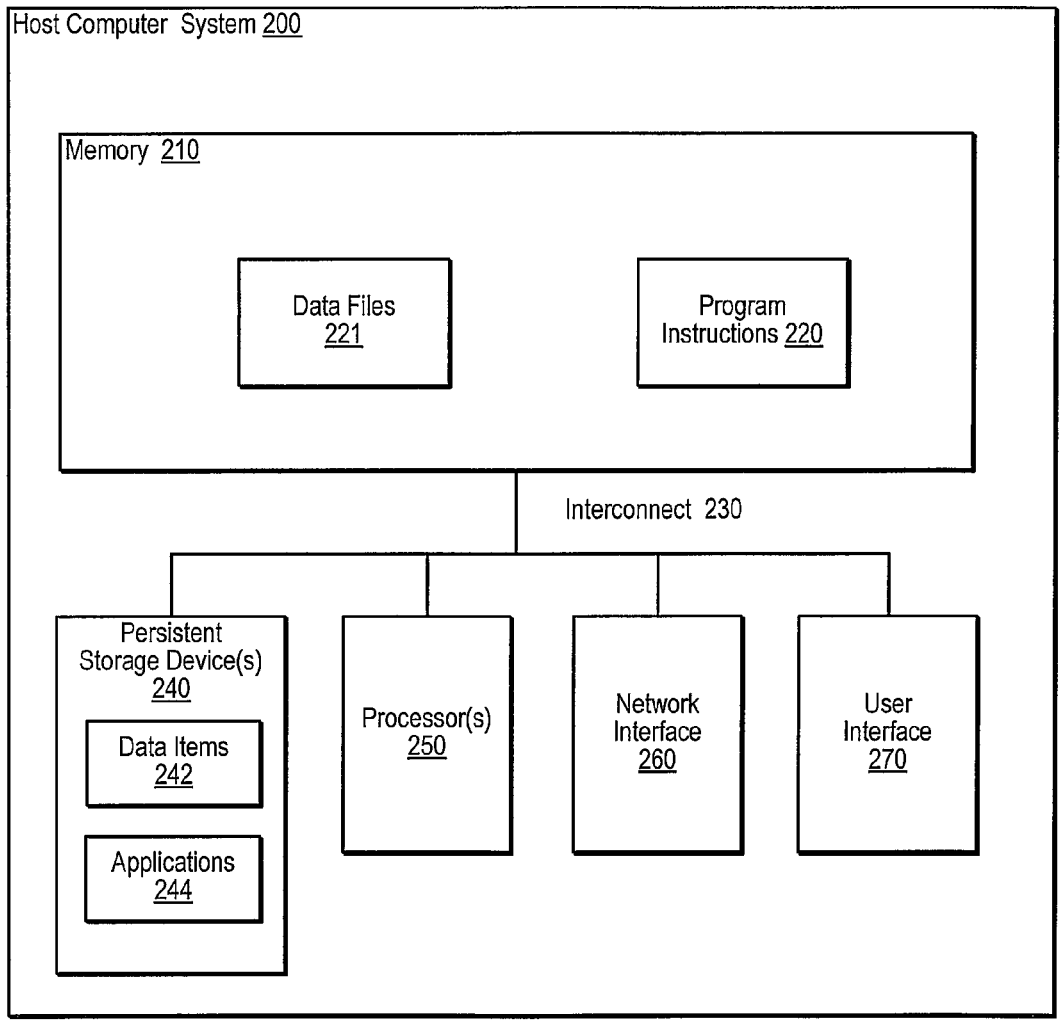
FIG. 2 illustrates one embodiment of a host computer system.

FIG. 2 illustrates one embodiment of a host computer system 200. It is noted that FIG. 2 is provided as an example for purposes of discussion, and in other embodiments the host computer system 200 may take on various other forms. Host computer system 200 may be representative of any of server computer systems 120 or client computer systems 110 described herein. Similarly, host computer system 200 may be used to implement any of the below-described methods. Host computer system 200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Host computer system 200 may include one or more processors 250, each of which may include one or more cores, any of which may be single or multi-threaded. Host computer system 200 may also include one or more persistent storage devices 240 (e.g. optical storage, magnetic storage, hard drive, tape drive, solid state memory, etc), which may include various data items 242 (e.g., files), and/or applications 244. Example applications include databases, email applications, office productivity applications, and a variety of others as known in the art. Host computer system 200 may include one or more memories 210 (e.g., one or more of cache, SRAM, DRAM, RDRAM, EDO RAM, DDR 10 RAM, SDRAM, Rambus RAM, EEPROM, etc.). Host computer system 200 may also include one or more network interfaces 260 for transmitting and receiving data, such as to or from client computer systems 110 or server computer systems 120, as described herein. Host computer system 200 may further include one or more user interfaces 270 for receiving user input or displaying output to users, such as a keyboard, mouse or other pointing device, touch screen, and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.).

One or more of the system memories 210 may contain program instructions 220. Program instructions 220 may be encoded in platform native binary, any interpreted language such as Java® byte-code, or in any other language such as C/C++, Java®, etc or in any combination thereof. One or more of the system memories 210 may also contain data files 221. Specific program instruction modules and data files that may be included in a system memory of a client computer system and a server computer system are illustrated in FIG. 3 and FIG. 4, respectively.

Figure 3:
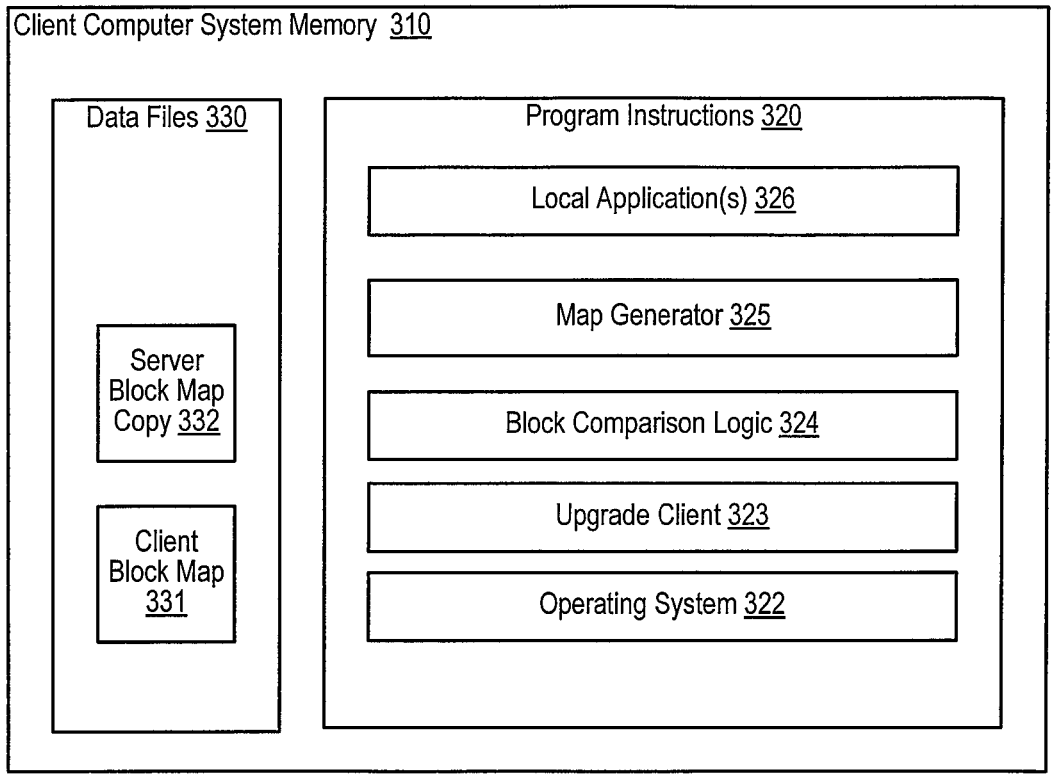
FIG. 3 illustrates one embodiment of a client computer system memory.

FIG. 3 illustrates one embodiment of a client computer system memory 310. As shown, memory 310 may include program instructions 320 and data files 330. According to the illustrated embodiment, program instructions 320 may comprise specific modules executable to implement one or more operating systems 322, such as the Windows® operating system, the Solaris® operating system, and/or the Linux® operating system. In addition, program instructions 320 may include modules to implement one or more of an upgrade client 323, block comparison logic 324, a map generator 325, and one or more local applications 326. As is further shown, data files 330 may include a client block map 331 and a copy of a server block map 332. Operation of these modules and data files will be described in further detail below. Program code included in program instructions 320 can be combined together or separated into various modules as desired, according to a particular embodiment.

Figure 4:
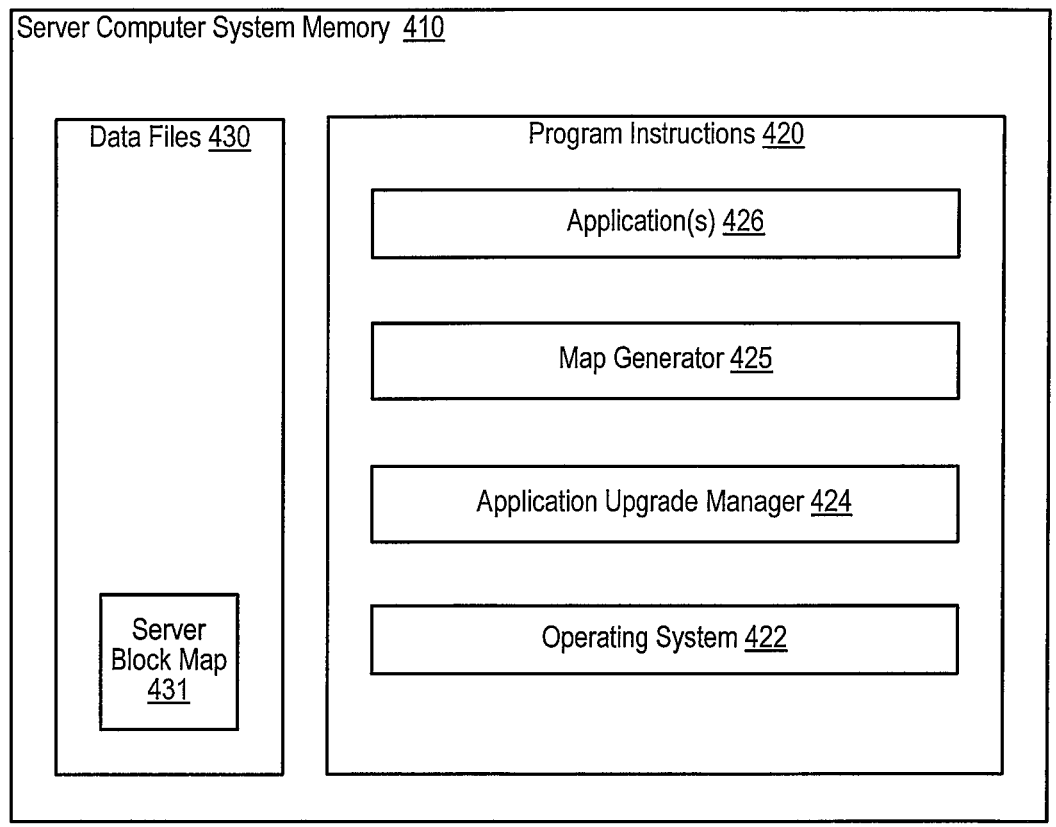
FIG. 4 illustrates one embodiment of a server computer system memory.

FIG. 4 illustrates one embodiment of a server computer system memory 410. As shown, memory 410 may include program instructions 420 and data files 430. According to the illustrated embodiment, program instructions 420 may comprise specific modules executable to implement one or more operating systems 422, such as the Windows® operating system, the Solaris® operating system, and/or the Linux® operating system. In addition, program instructions 420 may include modules to implement one or more of an application upgrade manager 424, a map generator 425, and one or more applications 426. Operation of these modules will be described in further detail below. Program code included in program instructions 420 can be combined together or separated into various modules as desired, according to a particular embodiment.

During operation, application upgrade manager 424 may receive notification that an upgrade to one or more of applications 426 is available. Subsequently, upgrade client 323 may contact application upgrade manager 424 and be informed that an upgraded application 426 is available that corresponds to a local application 326. In order to determine which portions of application 426 may differ from local application 326, map generators 425 and 325 may be used to generate server block map 431 and client block map 331 of a data package that contains application 426 and a data package that contains local application 326, respectively. A data package, as used herein, may include one or more files, an executable image, or other data associated with an application. Application upgrade manager 424 may convey a copy of server block map 431 to upgrade client 323. Upgrade client 323 may receive the copy of server block map 431 and use block comparison logic 324 to compare it to client block map 331 to determine which blocks of application 426 are shared. Upgrade client 323 may request that certain identified blocks that are not shared be streamed from application upgrade manager 424 on an as-needed basis as described further below according to a particular embodiment.

Figure 5:
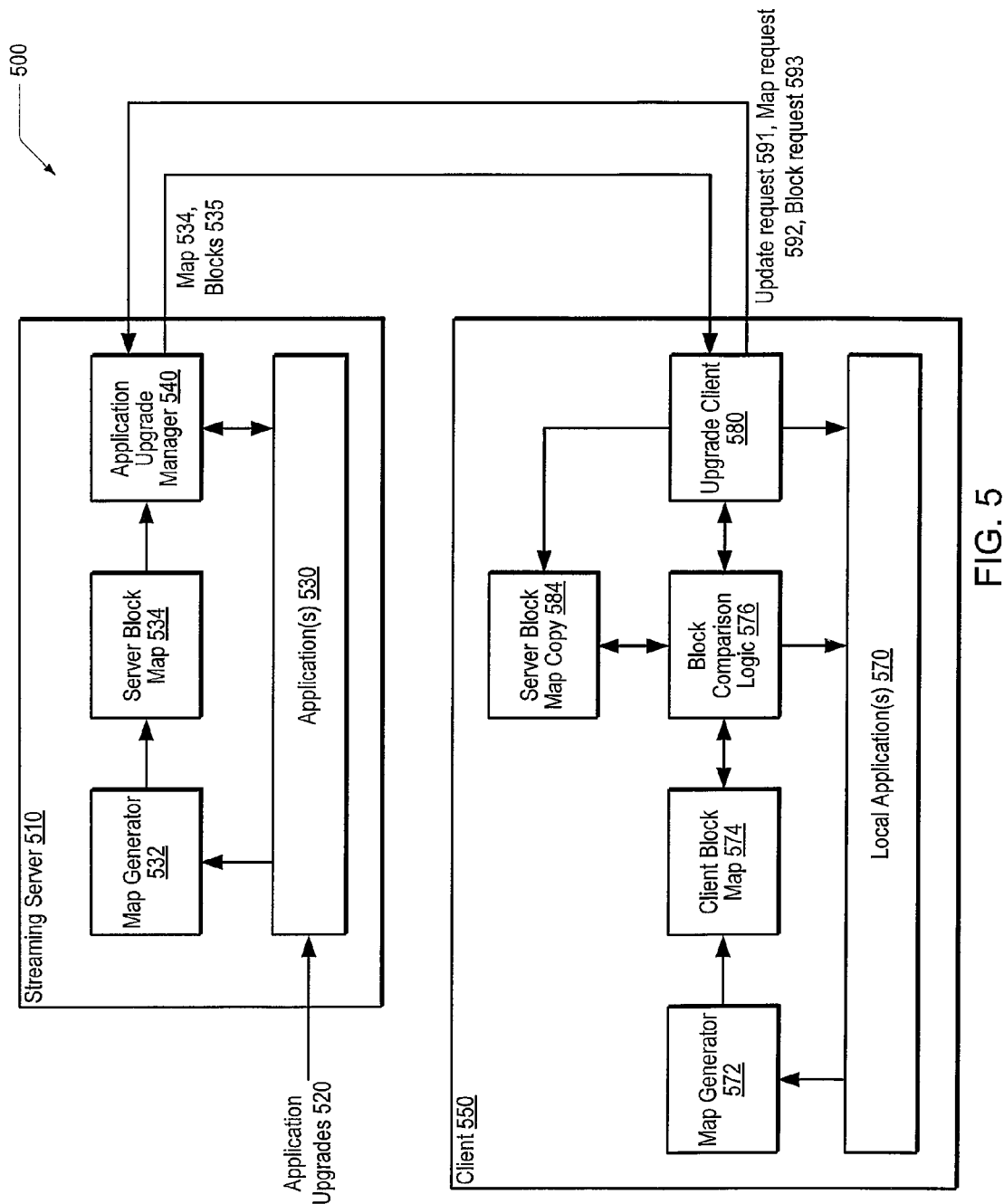
FIG. 5 illustrates client and server components of one embodiment of a system for reducing the amount of data transferred during streaming of an application upgrade.

FIG. 5 is a detailed block diagram of one embodiment of components used to reduce the amount of data transferred during streaming of an application upgrade. In the illustrated embodiment, a streaming server 510 is shown coupled to a client 550. Streaming server 510 is representative of any of server computer systems 120 of FIG. 1. Streaming server 510 may be implemented as illustrated by host computer system 200 of FIG. 2 and may include components such as those shown in memory 410 of FIG. 4. Client 550 is representative of any of client computer systems 110 of FIG. 1. Client 550 may be implemented as illustrated by host computer system 200 of FIG. 2 and may include components such as those shown in memory 310 of FIG. 3. Streaming server 510 may include an application upgrade manager 540, one or more applications 530, and a map generator 532 for generating a server block map 534. Client 550 includes an upgrade client 580, one or more local applications 570, a map generator 572 for generating a client block map 574, and block comparison logic 576 for comparing client block map 574 to a server block map copy 584. Upgrades to application 530 may be received by server 510 as application upgrades 520 from any of a variety of external sources. Application upgrade manager 540 and upgrade client 580 may communicate using various signals as described below in order to transfer portions of a package containing upgraded application 530 that correspond to local application 570 within client 550.

In one embodiment, during operation, streaming server 510 may receive one or more application upgrades 520 and apply them to application 530 to produce packages containing applications 530 that are available to be streamed to clients as upgrades. Subsequently, upgrade client 580 may contact streaming server 510 via upgrade request 591. For example, in one embodiment, upgrade client 580 may poll streaming server 510 periodically to determine whether or not upgrades are available for any of local applications 570. In an alternative embodiment, upgrade client 580 may contact streaming server 510 via upgrade request 591 in response to a user attempt to execute a particular local application 530. Upgrade client 580 may receive a response to request 591 including a notification that one or more applications 530 are available as upgrades that corresponds to local applications 570.

Having been notified that one or more application upgrades are available, upgrade client 580 may request a block map of an available application 530 upgrade package via map request 592. In one embodiment, streaming server 510 may generate a block map of an application 530 upgrade package in response to the request. Alternatively, streaming server 510 may generate a block map of a given application 530 upgrade package when an upgrade 520 is received in anticipation that a client may request it in the future. To generate a block map, streaming server 510 may use map generator 532 to generate server block map 534. More particularly, in one embodiment, map generator 532 may create a content-based block map by first dividing an application 530 upgrade package into a set of chunks, creating a map of the chunks that includes a uniquely identifying hash for each chunk. For example, in one embodiment, a map may be created by applying a rolling Rabin fingerprint to an application file. The Rabin fingerprint may be calculated at each point in the file. If the fingerprint is equal to an arbitrarily chosen number, a chunk may be created. A cryptographic hash of each chunk may calculated using the SHA-1 algorithm, or any other suitable algorithm. Information about each chunk's size, location, and hash value are assembled as a server block map 534.

Application upgrade manager 540 may receive a request from upgrade client 580 for a block map of the available application 530 upgrade package and respond by conveying a copy of server block map 534 to upgrade client 580. Upgrade client 580 may receive the copy of server block map 534 and store it as server block map copy 584.

In addition, client 550 may use map generator 572 to generate a block map of a package containing local application 570 that corresponds to the given application 530. In one embodiment, client 550 may use map generator 572 to generate a block map of a local application 570 package in response to receiving a notification that an application 530 is available as an upgrade that corresponds to local application 570 so that the local map is based on the most current state of application 570. In some alternative embodiments, portions of the local map may be generated and stored locally to be available when an upgrade becomes available. Map generator 572 may generate a map of a local application 570 package in the same manner used by map generator 532 to generate server block map 534.

Once client block map 574 and server block map copy 584 are both available on client 550, client 550 may begin assembling blocks needed to perform an upgrade of local application 570, block-by-block. A determination that a block is needed may be made in a variety of ways. For example, in one embodiment, client 550 may receive information from server 510 indicating that certain blocks are needed, such as critical blocks that are used to begin execution of a given application. This method may be used when an upgrade includes a new critical block that has no equivalent in any earlier version of the given application. In an alternative embodiment, client 550 may determine that a block is needed if it has been used to execute an earlier version of the given application at any time in the past. In another embodiment, client 550 may determine that a subset of blocks are needed to begin execution of the given application, requesting the subset of blocks. Subsequently, client 550 may determine that one or more additional blocks are needed, such as when a user attempts to access infrequently—used application features that depend on the additional blocks. In this case, client 550 may convey additional block requests to server 510 to retrieve the additional blocks on an as-needed basis. In some embodiments, client 550 may determine that blocks are needed by first determining which files are needed and then requesting all blocks that are associated with a needed file. Any of the above methods for determining that a block is needed may be used alone or in combination in various embodiments.

For each block that is needed to execute local application 570, client 550 may first determine if a local copy of the block is available by comparing data in client block map 574 to data in server block map copy 584 using block comparison logic 576. If a block is not needed to execute local application 570, client 550 may not request the block from streaming server 510 even though an upgraded version of the block may be available. If a given, needed block of the same hash value and size exists within a local application 570 package as indicated by client block map 574, the local block may be copied and used to upgrade local application 570. If a given, needed block of the same hash value and size does not exist within local application 570 as indicated by client block map 574, upgrade client 580 may request the given block from streaming server 510 via block request 593. Client 550 may receive the given block from streaming server 510 as a block 535 and use it to upgrade local application 570.

To simplify the discussion, FIG. 5 shows a single client 550. However, in alternative embodiments, additional clients may be coupled to a single streaming server 510. Each client may have a set of installed local applications of various versions, releases, service pack levels, etc. A single streaming server may provide upgrades to multiple different versions of a given local application by providing only chunks of data that differ from the locally installed application data at the request of each individual client. Individual clients may compare copies of a common server block map to their local client block maps to determine which chunks have been changed, subsequently requesting any changed block that is needed. The server is not required to maintain any record of the state of the local applications on each client. The server delivers a complete block map and delivers blocks in response to specific client requests.

A Rabin fingerprint, as used herein, refers to a polynomial representation of a portion of a data file module a pre-determined irreducible polynomial. Chunks created using a Rabin fingerprint may be of variable block size because chunk boundaries are determined by a particular pattern of file content rather than by a fixed length block size. Basing chunk boundaries on a particular pattern of file content may reduce the number of chunks that are changed when content is deleted or inserted into a file. In alternative embodiments, any fingerprint that is based on file content rather than by a fixed length block size may be used. A more detailed example of the properties of a Rabin fingerprint is describe below in connection with FIG. 8.

Figure 6A:
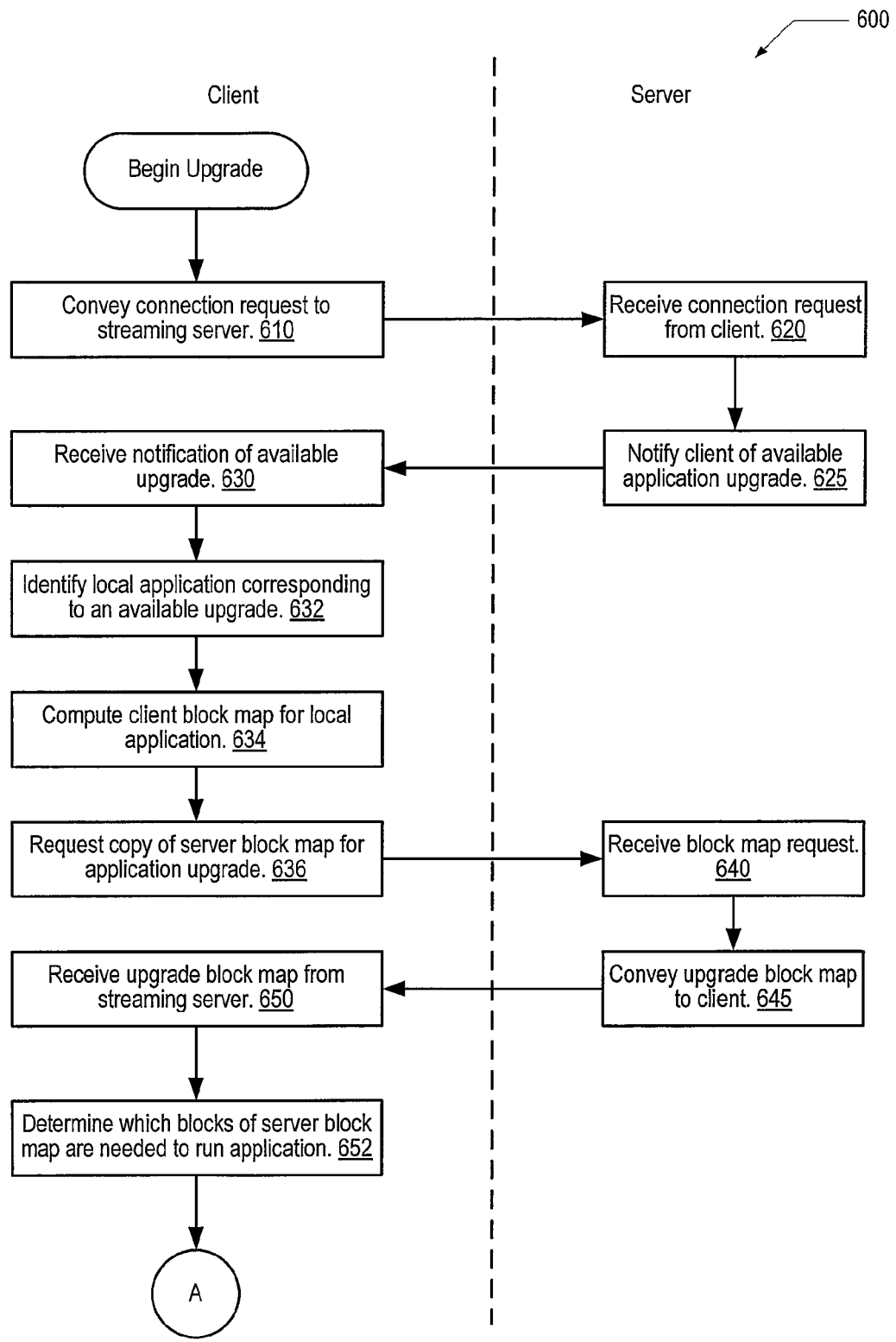
FIGS. 6a and 6b illustrate one embodiment of a process that may be used to upgrade an application on a computer system.
Figure 6B:
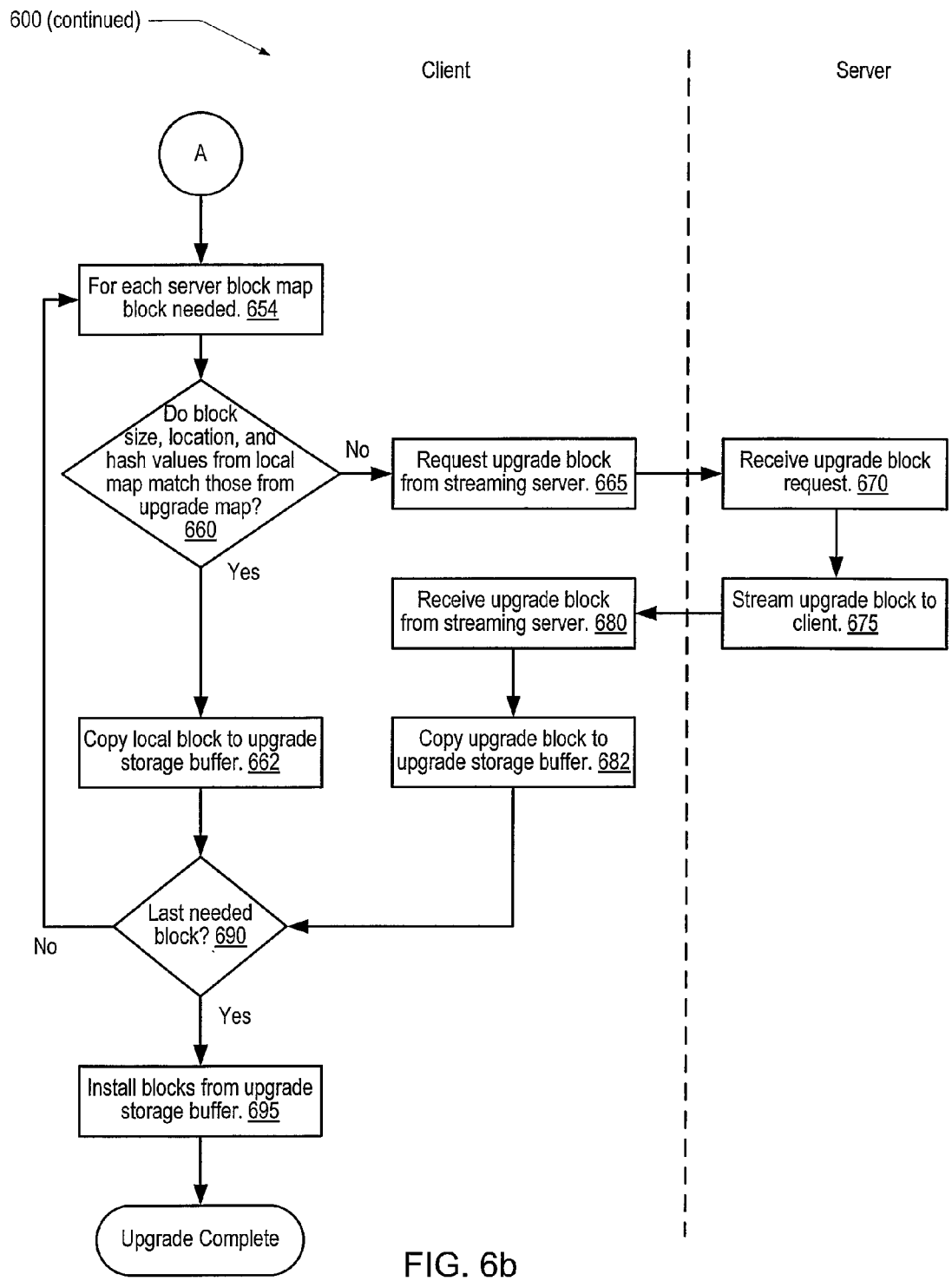

FIGS. 6a and 6b illustrate one embodiment of a process 600 that may be used to upgrade an application on a computer system. Within FIGS. 6a and 6b, blocks on the left may be executed by a client and blocks on the right may be executed by a server. Process 600 may begin with a client conveying a connection request to a streaming server (block 610). For example, in one embodiment, a request may be conveyed in response to a client user attempting to execute a previously installed application. Alternatively, in another embodiment, a client may issue requests on a periodic or other basis to poll a server for information about available upgrades to one or more applications. A server may receive a client connection request (block 620) and in response, notify the client of any available application upgrades (block 625). The client may receive a notification of available application upgrades (block 630) and identify a local application that corresponds to an available application upgrade (block 632). The client may then compute a client block map of a package that includes the identified local application (block 634) and request a copy of a corresponding server block map for a package that includes the available application upgrade (block 636). The server may receive the block map request (block 640) and convey a copy of the corresponding server block map to the client (block 645). The client may receive the copy of the corresponding server block map (block 650) and determine which blocks of the server block map are needed to execute the identified local application (block 652). More specifically, the client may determine which blocks would be needed if the entire application were to be streamed to the client from the steaming server, given that streamed applications may be started without all blocks being present on the client.

For each block in the copy of the server block map that is needed (block 654), the client may determine if a hash value and size of the block match the hash value and size of a block in the client block map (decision block 660). If there is a match, the local block may be copied to an upgrade storage buffer allocated to hold a package including an upgrade image of the identified local application (block 662). If the matching block is not the last needed block (decision block 690), the upgrade process may proceed at block 654. If the matching block is the last needed block (decision block 690), the upgrade may be executed from the upgrade storage buffer (block 695), completing the upgrade process).

If the hash value and size of a block in the server block map do not match the hash value and size of a block in the client block map (decision block 660), the client may request an upgrade block from the streaming server (block 665). The server may receive an upgrade block request (block 670) and stream the requested block to the client in response (block 675). The client may receive the upgrade block from the streaming server (block 680) and copy the upgrade block to the upgrade storage buffer (block 682) for use in executing the upgraded application. Flow of the upgrade process may then continue at decision block 690, as described above until all needed blocks have been copied from the local application or received from the streaming server. In one embodiment, process 600 may be repeated by a client to upgrade additional local applications.

Figure 7:
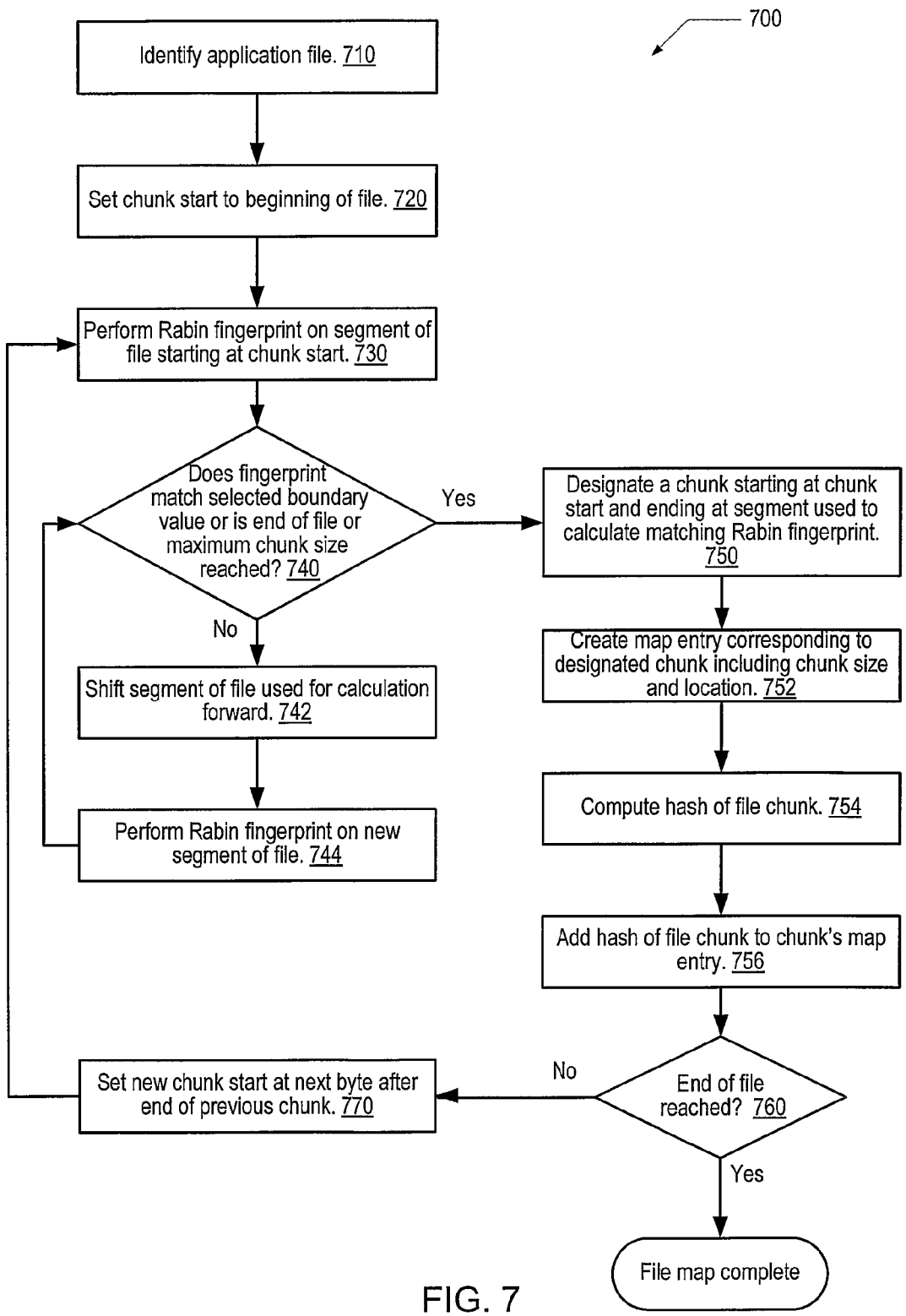
FIG. 7 illustrates one embodiment of a process that may be used to generate a hash map from an application file.

FIG. 7 illustrates one embodiment of a process 700 that may be used to generate a hash map from an application file. Process 700 may begin with identification of an application file (block 710). For example, a server may identify a file that is received as an upgraded version of an existing application or a client may receive an indication of an application for which a corresponding upgrade may be available. A first chunk starting point may be set at the beginning of the file (block 720). A Rabin fingerprint may be calculated on data in a segment of the file starting at the chunk starting point (block 730). If the calculated fingerprint does not match a pre-determined boundary value and the end of the file has not been reached and the size of the chunk has not reached a configurable maximum value (decision block 740), the segment of data used to calculate a Rabin fingerprint may be shift forward (block 742), a new fingerprint may be calculated on the new segment (block 744), and process 700 may continue at decision block 740. If the calculated fingerprint matches a predetermined boundary value or if the end of the file is reached or if the size of the chunk reaches a configurable maximum value (decision block 740), a chunk may be designated starting at the chunk starting point and ending at the end of the segment used to calculate the Rabin fingerprint (block 750). For the designated chunk, an entry may be created in a block map that includes the designated chunk's location and size (block 752). A hash of the designated chunk may be computed (block 754) and added to the designated chunk's entry in the block map (block 756). If the end of the file has not been reached (decision block 760), a new chunk starting point may be set at the next byte after the end of the previous chunk (block 770) and process 700 may continue at block 730. If the end of the file has been reached (decision block 760), the file map is complete.

Figure 8:
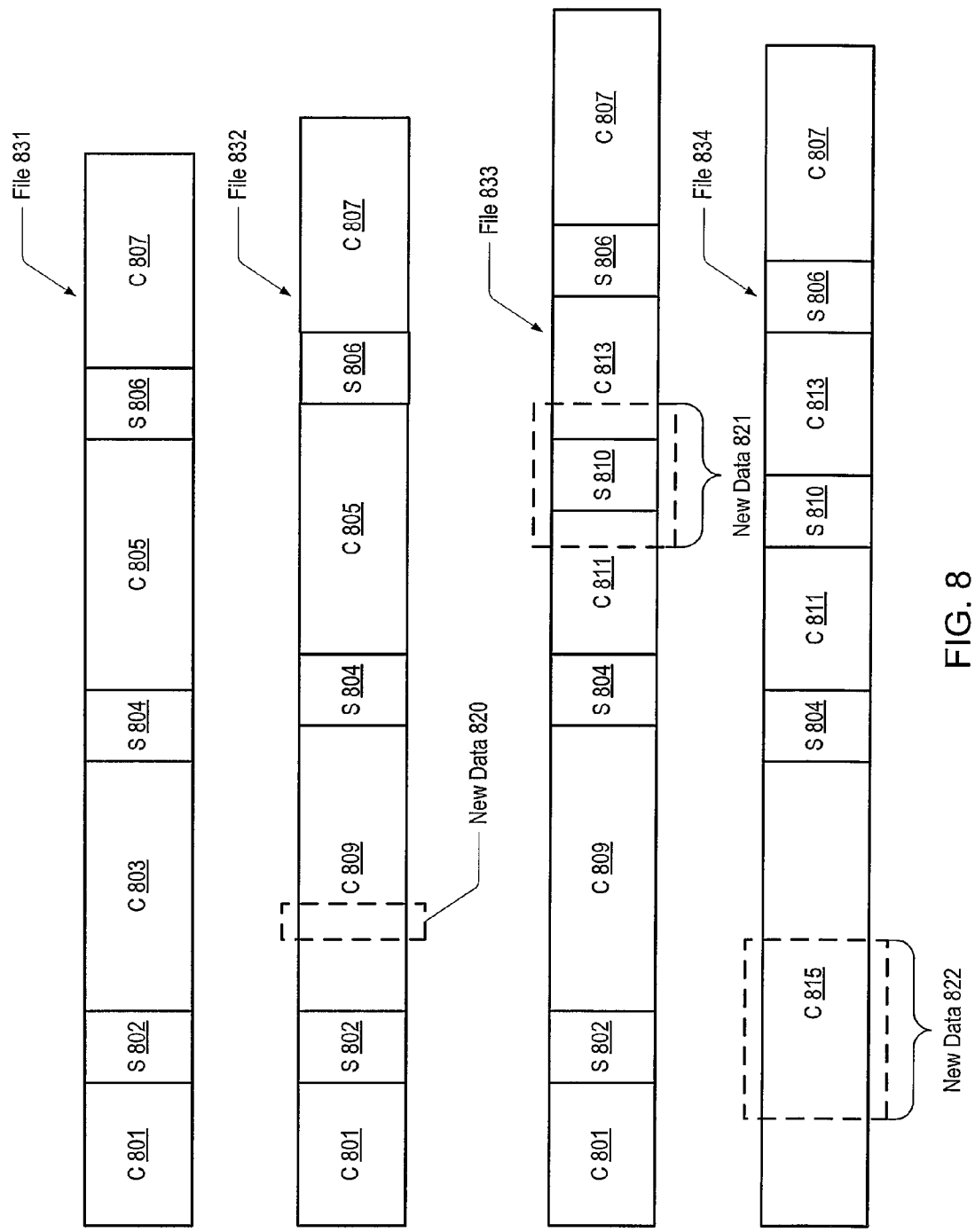
FIG. 8 illustrates one embodiment of a set of modifications of fingerprinted files.

Turning now to FIG. 8 one embodiment of a set of modifications of fingerprinted files is shown. In the illustrated embodiment, files 831-834 are shown. File 832 is a modified version of file 831 in which new data 820 has been inserted. File 833 is a modified version of file 832 in which new data 821 has been inserted. File 834 is a modified version of file 833 in which new data 822 has been inserted. File 831 includes chunks C 801 that includes a breakpoint S 802, C 803 that includes a breakpoint S 802, C 805 that includes a breakpoint S 802, and C 807. Breakpoints are content-specific boundary regions that are determined by computing a rolling Rabin fingerprint on the data beginning at the first byte of the file or the first byte after a previous breakpoint until another breakpoint or the end of the file is reached. To find a breakpoint, a Rabin fingerprint may be computed over every overlapping fixed size portion of the data beginning at the first byte of the file or the first byte after a previous breakpoint until the fingerprint matches a predetermined value.

File 832 illustrates the effect of inserting data into file 831 between breakpoints where the new data does not create a new breakpoint. New data 820 is inserted into chunk C 803, modifying the data between breakpoints S 802 and S 804. Consequently, in file 832, chunk C 803 becomes a new chunk C 809. Chunks C 801, C 805, and C 807 are unchanged. File 833 illustrates the effect of inserting data into file 832 between breakpoints where the new data creates a new breakpoint. New data 821 is inserted into chunk C 805, modifying the data between breakpoints S 804 and S 806. New data 821 includes data that matches the predetermined value such that a new breakpoint, S 810, is introduced into file 833. In addition, two new chunks, C 811 and C 813, replace chunk C 805 in file 833. File 834 illustrates the effect of inserting data into file 833 where the new data modifies an existing breakpoint. New data 822 is inserted into chunk C 801, modifying the data of breakpoint S 802. A new chunk, C 815 replaces chunks C 801 and C 809 in file 834. By identifying breakpoints based on content, note that chunk C 807 and any subsequent chunks remain unchanged through the above changes to file 831 that produce file 834.

It is noted that the foregoing flow charts are for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. It is intended that the following claims be interpreted to embrace all such variations and modifications.

What is claimed is:

1. A computing system comprising:
a client; and
a server configured to stream application upgrades to the client;
wherein the client is configured to:
  determine that an upgrade to an application currently installed on the client is available;
  receive a first map from the server that corresponds to an upgraded version of the application, wherein the upgraded version of the application includes a first data block and a second data block that differ from corresponding first and second data blocks in the application currently installed on the client;
  determine which data blocks of the upgraded version of the application are needed for execution on the client, wherein said determining includes determining that the first data block is needed and the second data block is not needed;

compare the first map to a second map that corresponds to the application currently installed on the client to determine that one or more of the data blocks of the upgraded version of the application that are needed for execution on the client are not present in the application currently installed on the client; and request the one or more data blocks from the server, wherein the one or more data blocks include the first data block, wherein the client is configured to not request the second data block from the server.

2. The computing system of claim 1, wherein:
the first and second maps each include a plurality of entries;
entries in the first map correspond to data blocks that correspond to the upgraded version of the application;
entries in the second map correspond to data blocks that correspond to the application currently installed on the client; and
each entry includes data describing a size, a location, and a hash value of a corresponding data block.

3. The computing system of claim 2, wherein:
said one or more data blocks comprise variable sized portions of a data file; and
a boundary defining a size of a given data block is determined by identifying that a predetermined pattern of data exists in the data file.

4. The computing system of claim 1, wherein:
the upgraded version of the application includes a plurality of files; and
the first map includes a plurality of separate maps, each of which corresponds to a respective one of the plurality of files.

5. The computing system of claim 1, wherein in performing said determining which data blocks of the upgraded version of the application are needed, the client is further configured to receive information from the server identifying data blocks of the upgraded version of the application that are needed for execution on the client.

6. The computing system of claim 1, wherein in performing said determining that the upgrade to the currently installed application is available, the client is further configured to request upgrade information from the server in response to a user attempting to execute the currently installed application.

7. A computer-implemented method for upgrading an application, the method comprising:
determining that an upgrade to a currently installed application is available;
receiving a first map from a server, wherein the first map corresponds to an upgraded version of the application, wherein the upgraded version of the application includes a first data block and a second data block that differ from corresponding first and second data blocks in the currently installed application;
determine which data blocks of the upgraded version of the application are needed for execution of the upgraded version of the application, wherein said determining includes determining that the first data block is needed and the second data block is not needed;
comparing the first map to a second map that corresponds to the currently installed application to determine that one or more of the data blocks of the upgraded version of the application that are needed for execution are not present in the currently installed application; and;
requesting the one or more data blocks from the server, wherein the one or more data blocks include the first data block, wherein the second data block is not requested from the server.

8. The method of claim 7, wherein:
the first and second maps each include a plurality of entries;
entries in the first map correspond to data blocks that correspond to the upgraded version of the application;
entries in the second map correspond to data blocks that correspond to the currently installed application; and
each entry includes data describing a size, a location, and a hash value of a corresponding data block.

9. The method of claim 8, wherein:
said one or more data blocks comprise variable sized portions of a data file; and
a boundary defining a size of a given data block is determined by identifying that a predetermined pattern of data exists in the data file.

10. The method of claim 7, wherein:
the upgraded version of the application includes a plurality of files; and
the first map includes a plurality of separate maps, each of which corresponds to a respective one of the plurality of files.

11. The method of claim 7, wherein said determining which data blocks of the upgraded version of the application are needed comprises receiving information from the server identifying data blocks of the upgraded version of the application that are needed for execution of the upgraded version of the application.

12. The method of claim 7, wherein said determining that the upgrade to the currently installed application is available comprises requesting upgrade information from the server in response to a user attempting to execute the currently installed application.

13. A non-transitory computer readable storage medium storing program instructions executable by a client computing system to:
determine that an upgrade to an application currently installed on the client computing system is available;
receive a first map from a server that corresponds to an upgraded version of the application, wherein the upgraded version of the application includes a first data block and a second data block that differ from corresponding first and second data blocks in the application currently installed on the client computing system;
determine which data blocks of the upgraded version of the application are needed for execution on the client computing system, wherein said determining includes determining that the first data block is needed and the second data block is not needed;
compare the first map to a second map that corresponds to the application currently installed on the client computing system to determine that one or more of the data blocks of the upgraded version of the application that are needed for execution on the client computing system are not present in the application currently installed on the client computing system; and
request the one or more data blocks from the server, wherein the one or more data blocks include the first data block, wherein the second data block is not requested from the server.

14. The non-transitory computer readable storage medium of claim 13, wherein:
the first and second maps each include a plurality of entries;
entries in the first map correspond to data blocks that correspond to the upgraded version of the application;
entries in the second map correspond to data blocks in that correspond to the currently installed application; and
each entry includes data describing a size, a location, and a hash value of a corresponding data block.

15. The non-transitory computer readable storage medium of claim 14, wherein:
   said one or more data blocks comprise variable sized portions of a data file; and
   a boundary defining a size of a given data block is determined by identifying that a predetermined pattern of data exists in the data file.

16. The non-transitory computer readable storage medium of claim 13, wherein:
   the upgraded version of the application includes a plurality of files; and
   the first map includes a plurality of separate maps, each of which corresponds to a respective one of the plurality of files.

17. The non-transitory computer readable storage medium of claim 13, wherein in performing said determining which data blocks of the upgraded version of the application are needed, the program instructions are further executable by the client computing system to receive information from the server identifying data blocks of the upgraded version of the application that are needed for execution on the client computing system.

\* \* \* \* \*